Aug. 4, 1970    J. G. P. LOMBARD    3,522,543
DEVICE FOR MEASURING THE MOVEMENT AND TRACING THE POSITION
OF A MOVABLE MEMBER IN RELATION TO A STATIONARY MEMBER
Filed May 3, 1967    3 Sheets-Sheet 1

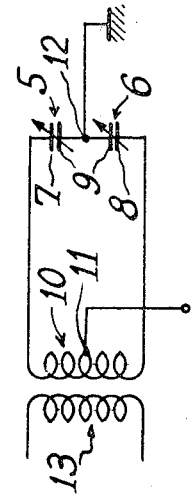
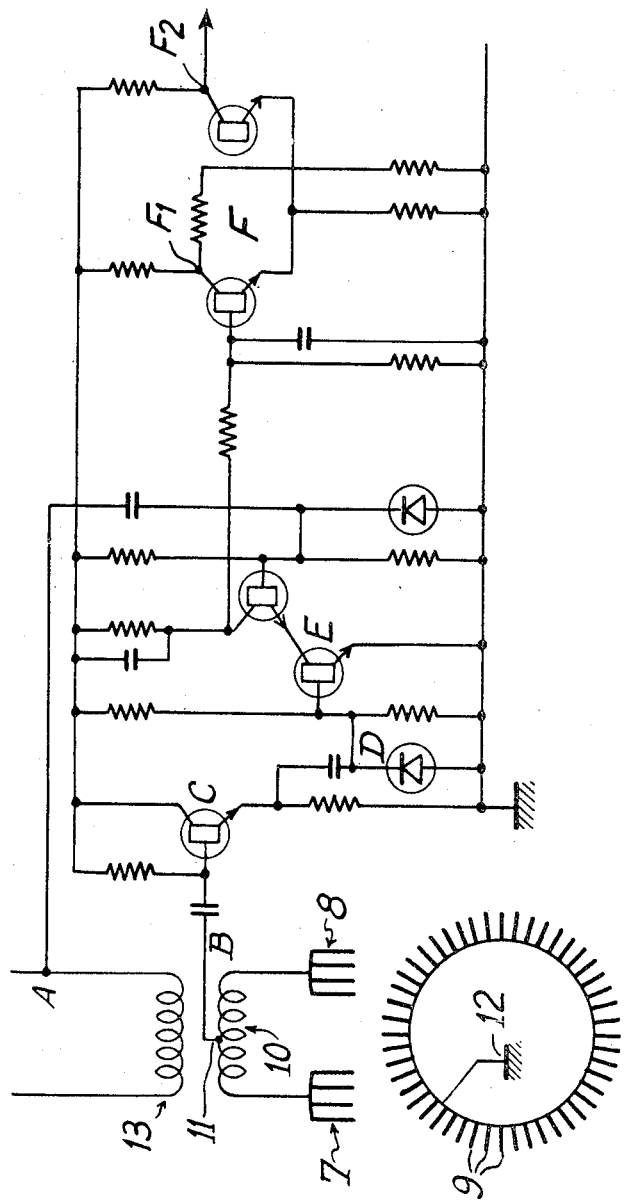
Fig. 4
Fig. 5

United States Patent Office 3,522,543
Patented Aug. 4, 1970

3,522,543
DEVICE FOR MEASURING THE MOVEMENT AND TRACING THE POSITION OF A MOVABLE MEMBER IN RELATION TO A STATIONARY MEMBER
Jean G. P. Lombard, Boulogne-sur-Seine, France, assignor to Centre d'Etudes et de Recherches de la Machine-Outil, Neuilly-sur-Seine, Hauts-de-Seine, France
Filed May 3, 1967, Ser. No. 635,853
Claims priority, application France, May 10, 1966, 61,006
Int. Cl. H03b 3/04; H01g 5/01
U.S. Cl. 328—133                    5 Claims

ABSTRACT OF THE DISCLOSURE

A device for determining the relative movement between members having two capacitive elements, each formed by cooperating strip elements carried by the members. The strips are arranged so that when the capacity of one of the capacitive elements is at a maximum the capacity of the other of the capacitive elements is at a minimum. The capacitive elements are incorporated in a measuring circuit which utilizes the change in capacitance to ascertain the relative movement between the members.

---

The purpose of the invention is to provide an improved device for measuring the movement and tracing the position of a movable member in relation to a stationary member.

It is usual to employ, for example, on machine tools with numerical control systems, devices which are sensitive to the movement of a movable member and which emit an analog or digital electric signal during the movement of the said member passed a fixed member.

The invention relates to digital devices in which the successive impulses emitted during the displacement of the moving member are counted in order to determine its position.

The use of capacitive pickups has already been proposed for measurement the movement and tracing the position of a movable member in relation to a stationary member. In a known device of this kind, there are four different elements: a fixed exciter plate, connected to an outlet terminal of an oscillator, a rotating plate affixed to a screw controlling the movement of the movable member, and two fixed detector plates. The insulating rotating plate is provided on both faces with sectors of conductive metal. The detector plates are separated from one another by a dielectrical material and at such an angle apart that they can out of phase with one another by 90°. Each of them is connected to an amplifier.

In this same known device, use is made of a bridge-circuit, one single condenser of one of the branches having a variable capacity during the rotation of the rotor plate.

The purpose of the invention is to provide a device of considerably simplified design by comparison with the known device mentioned above. Furthermore, despite this simplified construction, the invention is intended to make it possible to obtain two condensers of which the capacity is variable during the rotation of a rotating element, these variable condensers being each inserted in the appropriate branch of a bridge circuit. Thanks to this arrangement, as will be explained more clearly in due course, the device covered by the invention has twice the sensitivity and is also less affected by the accidental variation in the capacity of the condensers.

According to the invention, a first member is provided with at least one of the elements constituting each of two condensers of variable capacity, while the other member is correspondingly provided with a plurality of complementary elements constituting these two condensers of variable capacity, these latter elements being positioned in succession, with a pitch P, and the first elements, integral with the first member, being themselves separated by a distance equal to a whole number of such steps, the two condenser thus formed being each inserted in the appropriate branch of a bridge circuit of which the other two branches are each formed by a fraction of a winding with an intermediate tapping, the said winding being excited by a carrier frequency and the bridge circuit being connected to the input terminals of an electronic detection and counting apparatus.

Each of the constituent elements borne by the first member is made up of a number of primary elements which are interconnected and which are separated from one another by a distance equal to a whole number of half-steps.

The first member, bearing at least one of the constituent elements of each of two condensers, is also equipped with a further pair of constituent elements of two other condensers, this other pair being out of phase, in relation to the first pair and to the successive complementary elements of the other organ, by a quarter of a step, and these two other condensers forming part of another bridge circuit analogous to the preceding bridge circuit and excited by the same carrier frequency.

The capacity of a condenser can be varied by acting, separately or simultaneously, on the distance separating the armatures, on the effective areas by which the armatures face one another, and on the dielectric constant.

The invention is in no way confined to any particular method to be adopted for varying the capacity. However, to enable the invention to be understood more clearly, to bring out all its characteristics and to render its advantages more evident, a description will be given below of a version adopted as an example, in which it has been decided, without any limitative effect, to vary the capacity by varying the areas of the condensers.

Reference will be made to the accompanying drawings, wherein:

FIG. 4 is a bridge circuit diagram for the above two condensers;

FIG. 5 is a diagram representing the bridge circuit of FIG. 4 and a detection and counting apparatus;

In the example to be described, the device covered by the invention serves to measure and verify the movement, on a machine tool, of a carriage (not shown) which is movable on its slides 1 under the action of a screw 2.

Figure 1:
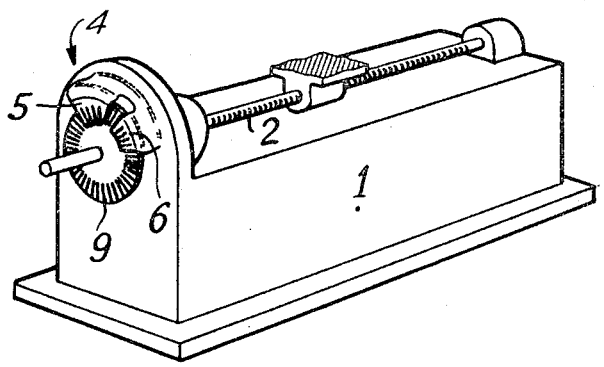
FIG. 1 illustrates an example of an actual installation of a part of the device to which the invention relates.

It will be assumed that the frame 3 of the machine constitutes the fixed member mentioned in the foregoing and that the movable member is the screw 2 and not the carriage itself. Part of the device covered by the invention is generally marked 4 in FIG. 1. It comprises two variable condensers, which can be seen more clearly in FIGS. 2 and 3, in which one of them is marked 5 and the other 6.

In this example, the dielectric of the condensers is the ambient air.

Figures 2, 3:
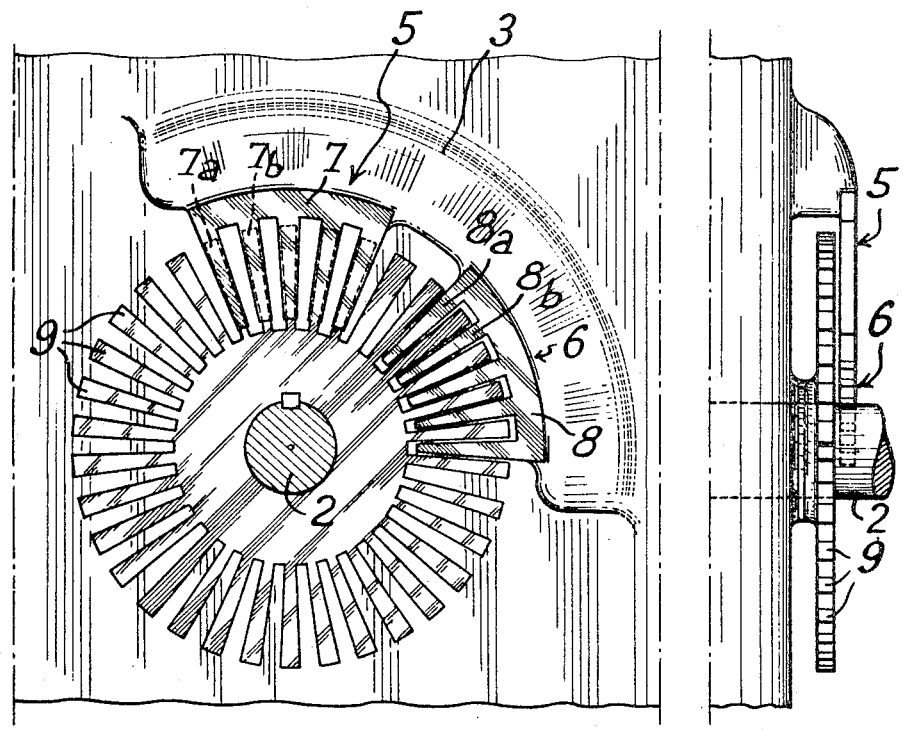
FIG. 2 illustrates a method for the construction, in circular form, of the elements constituting two condensers in accordance with the invention.
FIG. 3 is a lateral view of FIG. 2.

One of the elements forming part of each of the condensers 5 and 6, e.g., one of the armatures 7 and 8 respectively, is integral with the fixed member, i.e., with the frame 3, part of which is shown in FIG. 2.

More exactly, each armature 7 and 8 consists of a set of primary armatures 7a, 7b and 8a, 8b, similar to flat strips separated from one another by a space slightly exceeding their width.

The armatures 7 and 8 are mechanically integral with the frame 3 but are insulated from it electrically.

The other member, which in this instance is the movable screw 2, is provided with a plurality of complementary elements forming the two variable condensers 5 and 6. In this case, we have a set of successive primary armatures 9, arranged radially, in accordance with the primary armatures 7a, 7b, 8a, 8b, as may be seen from FIGS. 2 and 3.

The width of the armatures 9 is equal to that of the gaps separating the primary armatures 7a, 7b, and they are arranged on a circular rim with an even pitch P. They are connected electrically and mechanically to the screw 2 and can be rotated together with this latter. In this manner they are also connected electrically to the mass of the machine tool.

It will be noted that the subdivision of each armatures 7 and 8 into numerous primary elements of smaller width and distributed over a certain length tends to eliminate division and eccentricity errors. Cyclic faults in respect of pitch or parallelism can be eliminated still more effectively by using a number of armatures, such as 7 and 8, distributed around the rim formed by the armatures 9.

The armatures 7 and 8 are separated from one another by a distance equal to a whole number of half steps P, in such a way that when the primary elements 7a, 7b of the condenser 5 are opposite the armatures 9, the primary elements 8a, 8b of the condenser 6 are opposite the respective gaps separating the armatures 9.

During the rotation of the disc 2, the capacities of the condensers 5 and 6, consisting on the one hand of the armatures 7 and 8, respectively, and on the other hand of the armatures 9, vary from a maximum to a minimum, owing to the variation in the effective areas situated opposite to one another. Furthermore, when one of the condensers, 5 for example, has a maximum capacity, the other condenser 6a has at the same moment a minimum capacity.

As may be seen in FIG. 4, the device covered by the invention comprises a bridge circuit consisting of a winding 10 with an intermediate tapping 11 and two variable condensers 5 and 6. Each branch of the bridge includes half the winding 10 and one of the variable condensers.

The armatures 9 are connected to the mass, as mentioned farther back, at an intermediate point 12, while the intermediate tapping 11 is connected to an input terminal of a detection and measuring circuit of which the diagram is provided in FIG. 3.

The winding 10 is coupled inductively with another winding 13 in which, by means of an oscillator circuit not illustrated, a maintained carrier wave of a frequency of $f$ is generated. This, taken at A in the diagram in FIG. 5, is shown in the conventional manner at A in FIG. 6.

Figure 6:
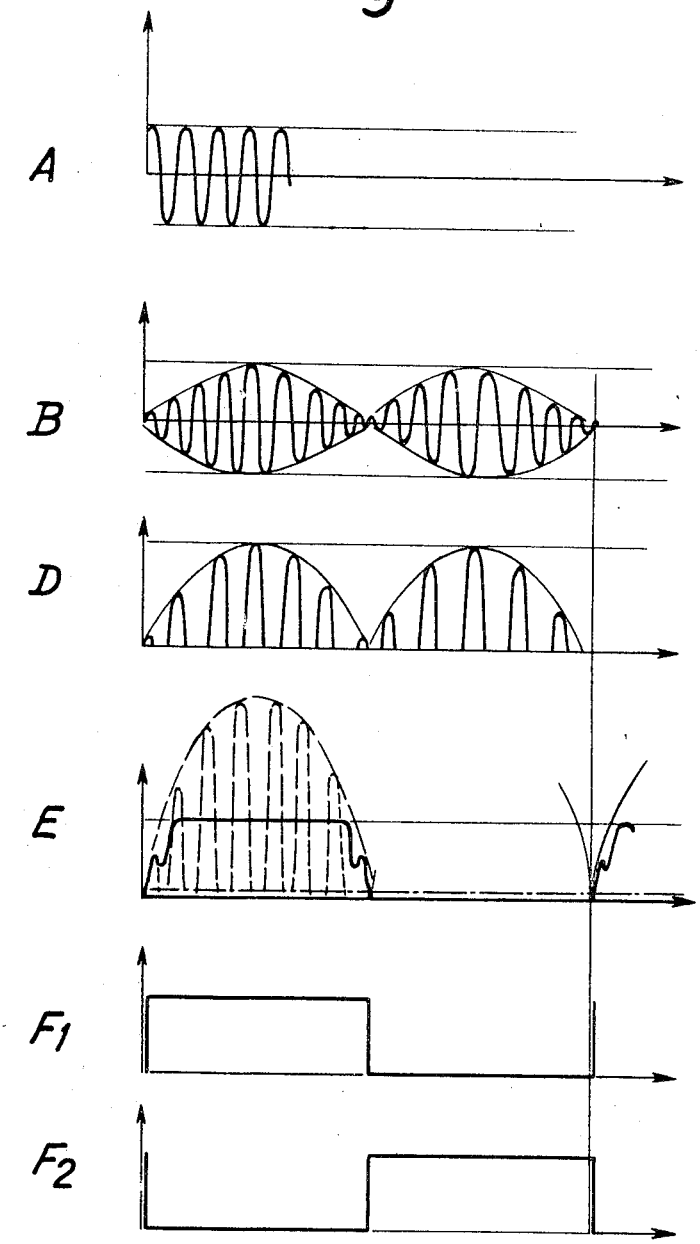
FIG. 6 is a set of graphs showing the form taken by the wave in the device and in the detection apparatus, at different points in the system shown by the diagram in FIG. 4.

The same wave is induced in the winding 10, but as the capacities of the condensers 7 and 8 of each branch of the bridge vary simultaneously, in opposite directions, on each turn performed by the screw 2, we obtain between the terminals 11 to 12 of the bridge an amplitude-modulated wave which, taken at B in the diagram in FIG. 5, for example, is also shown at B in FIG. 6.

It will be noted that the bridge circuit provided by the invention ensures that the pickup will be independent of the accidental variations in the distances between electrodes and ensures a satisfactorily stable zero.

The value of the frequency $f$ is not critical. It must merely be made sufficiently high to ensure that the impedance of the capacitive branches is low in comparison with that of the detection and measuring circuit connected to the terminals 11 to 12 of the bridge.

The invention is not confined to any particular method of processing the signal taken from the terminals of the bridge. This processing is carried out in the conventional manner, by the aid of known circuits, of which the purpose is to convert an amplitude-modulated wave into rectangular signals of a certain sufficiently high voltage.

In this example, the diagram in FIG. 5, which will not be described in detail, comprises, at C, an amplifier stage of high input impedance, formed by a transistor with a common collector circuit. The signal is then rectified at D (see also D in FIG. 6) and then demodulated and peak-clipped at E in a coincidence circuit ET (the form taken by the signal on emerging from the demodulator and after filtering and peak-clipping being shown at E in FIG. 6). Finally, it is given a rectangular form at F, in a monostable trigger circuit. The voltage variations obtained at the terminals $F_1$ and $F_2$ of the collectors of the circuit F are shown at $F_1$ and $F_2$ in FIG. 6.

Finally, during the rotation of the movable organ, in the present case the screw 2 and the movable armatures 9, we obtain a crenellated output voltage, in accordance with the pitch P of the armatures 9. This voltage is made sufficiently high to escape the influence of the parasitics.

By counting the voltage crenellations obtained, by a known means, it is possible to determine the exact angle through which the screw 2 has turned.

It will be noted that the value of the voltage of the rectangular signals is independent of the rotation speed of the movable organ in relation to the stationary organ.

If it is desired to be able to identify the direction of movement of the movable manner, a second set of two electrodes similar to armatures 7 to 8 is provided, out of phase in relation to these latter, opposite the movable armatures 9, by a quarter of a step. The second set of variable condensers thus formed is placed in a bridge circuit with another winding having an intermediate tapping coupled inductively with the winding 13 as well as wth the winding 10. A second electronic detection apparatus, identically similar to that of FIG. 5, supplied a second crenellated signal, out of phase by a quarter of a step in front of or behind the first signal. If this dephasing is detected by the conventional means, the direction of movement of the movable organ may thus be determined.

The material means of providing the elements forming the condensers may be any considered advantageous according to the prevailing circumstances (toothed wheels or sectors, cut from the solid, or moulded, of metal or of metallized insulating material, printed circuits, etc).

The movable armatures need not necessarily be arranged in a circular rim, and they can be arranged in a line with any radius or curvature or even in a straight line, when the movable member follows a rectilinear traject.

As already mentioned, the variation in the capacity of the condensers may also be effected, without departing from the principle of the invention, by varying a parameter other than the effective area of the armatures. For example, a dielectric substance with a variable dielectric constant could be moved by the movable member bewteen the fixed armatures of the two condensers integral with one another and belonging to the fixed member. Neither does the invention stipulate any particular way of modulating the carrier wave.

It is also possible, by using the device to which the invention relates, to produce an actual digital coding system, by associating a number of bridge circuits with the fixed member and the movable member. The elements which go to make up the variable condensers can in this case be driven by the movable member at equal or different speeds.

It is thus understood that the invention covers all possible modifications and variants which do not constitute a departure from its scope or principle.

What is claimed is:

1. A device for determining the relative position of relatively movable members, comprising:
   a stationary member,
   a first group of elements carried by said stationary member and spaced equidistantly from one another with a pitch P,
   a second group of elements carried by said stationary member and spaced equidistantly from one another with a pitch P,
   a movable member,
   a plurality of elements carried by said movable member and spaced equidistantly from one another with a pitch P,
   said first and second groups of elements being spaced from one another at a distance equal to an odd integral number of P/2,
   an electrical bridge circuit electrically connected to utilize the change in capacitance between said first group of elements and the elements of said movable member and between said second group of elements and said elements of said movable member to deliver an output signal indicative of the relative position of said stationary and movable members.

2. The system of claim 1 in which said bridge circuit includes a coil which has an electrical signal induced therein, said bridge circuit producing an amplitude-modulated signal when relative motion of said members occurs, a demodulator connected to said bridge circuit for converting said amplitude-modulated signal into pulse form.

3. The system of claim 1 wherein the elements constituting the first and second groups of elements are in the form of strips and the distance between adjacent strips is greater than the width of the strips.

4. The system of claim 3 wherein the movable member is rotatable the elements of the movable manner are in the form of strips, each having a width substantially equal to the spacing between adjacent strips of the first and second groups of elements and the elements of the movable member extend radially from the axis of said movable member.

5. The system of claim 2 wherein there are provided a third and a fourth group of elements carried by the stationary member, and further circuits which utilize the changes in the electrical capacitance between the third group of elements and the elements of the movable member and between the fourth group of elements and the elements of the movable member to deliver signal the phase of which is compared with said electrical pulses to determine the direction of movement of the movable member.

References Cited

UNITED STATES PATENTS 2,925,590  2/1960  Boltinghouse et al. ____ 324—61

DONALD D. FORRER, Primary Examiner

B. P. DAVIS, Assistant Examiner

U.S. Cl. X.R.

307—131; 324—60